May 16, 1944.  C. L. BEARD  2,348,876
METAL CUTTER
Filed Aug. 23, 1943
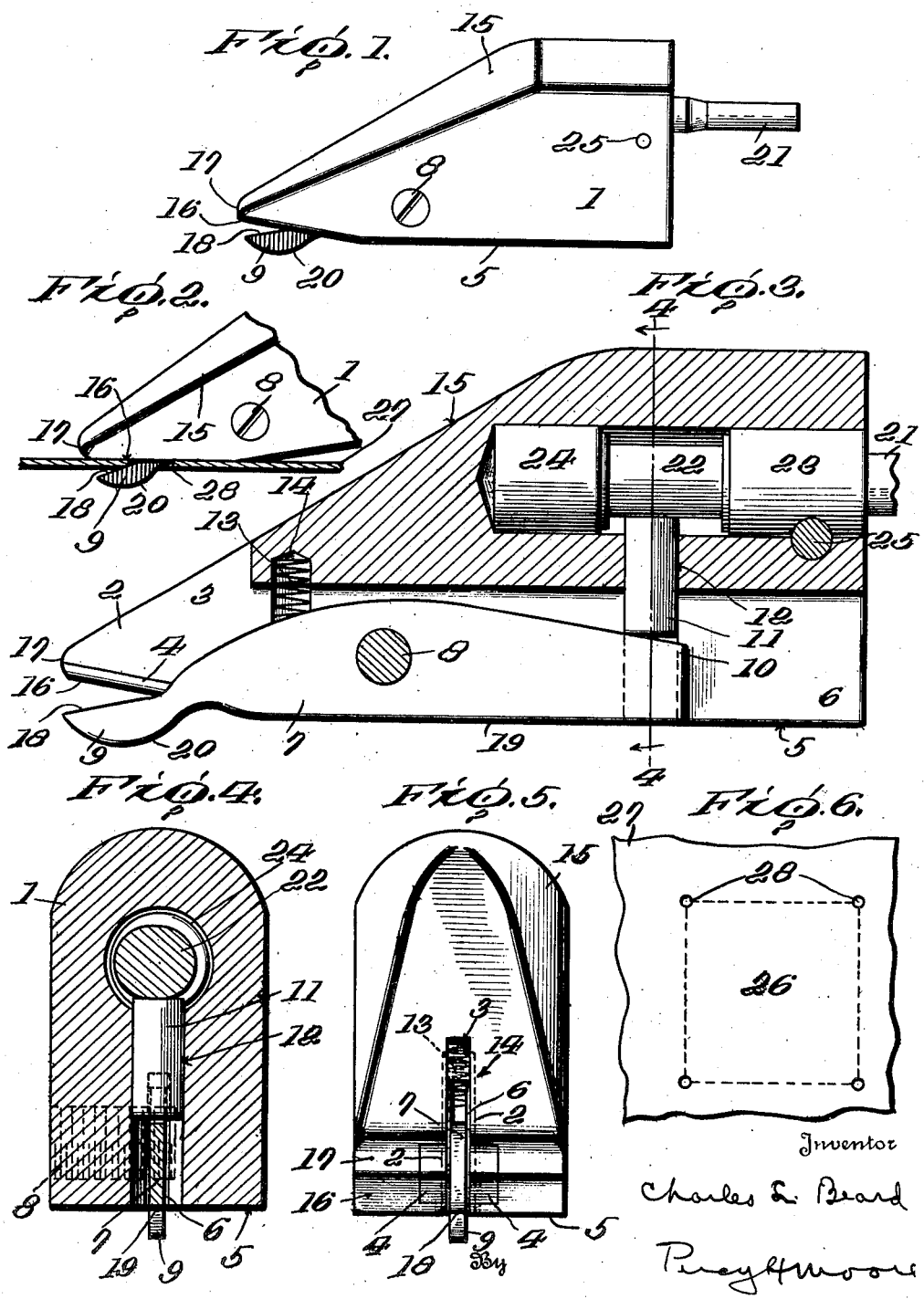
Inventor
Charles L. Beard
Percy H. Moore
Attorney Patented May 16, 1944

2,348,876

UNITED STATES PATENT OFFICE 2,348,876

METAL CUTTER

Charles L. Beard, Lancaster, Pa.

Application August 23, 1943, Serial No. 499,667

1 Claim. (Cl. 30—247)

My invention relates to power actuated cutting tools for cutting light sheet material in the course of the manufacture or repair of parts made from sheet metal or fibre board, such as automobile and air plane bodies, stove pipes etc., and is an improvement over Patent No. 2,273,376.

One of the objects of the invention is to provide a cutter, which when connected to a source of power such as a pneumatic or electric drill, will automatically swing to an operative position, thus leaving one hand free.

Another object of the invention is to provide a cutter adapted to be driven by practically any size of drill.

A still further object of the invention is to provide a cutter which can be conveniently and effectively applied in cutting out sections of damaged sheet material in making repairs.

These and other objects and advantages of the invention will be apparent as the specification is considered with the accompanying drawing, in which:

Figure 1 is a side elevation of the cutter;

Figure 2 is a fragmentary view of the front end of the cutter showing the cutter blade inserted through a hole in a piece of material being repaired;

Figure 3 is a longitudinal section through the cutter;

Figure 4 is a section on the line 4—4 of Figure 3;

Figure 5 is a front view of the cutter; and

Figure 6 is a plan view of a piece of material showing a damaged section marked for repair.

Referring more particularly to the drawing, 1 designates a body, preferably of cast metal, bifurcated at its front end or nose to define fixed top cutting blades or jaws 2. The blades or jaws 2 are formed by slotting the body 1, as at 3, and the cutting edges thereof are provided with inserts 4, of hardened steel or other suitable material adapted to enhance the cutting properties of the tool.

The body 1, is formed with a downwardly and forwardly inclined flat top face 15 and a straight flat bottom face 5, in the latter of which is cut a relatively deep longitudinally disposed slot 6, for the reception of a lower movable cutting blade 7, suitably mounted therein by means of a removable threaded pivot pin 8. The forward or cutting end 9 of blade 7 extends into and through the end slot 3, the latter, in effect, constituting a continuation of the slot 6, the blade being thus interposed between and shielded by the relatively heavy fixed cutting jaws or blades 2. A tail portion 10 of movable blade 7 is engaged by a cam follower or plunger 11, slidably seated in a circular opening 12 formed in the body 1, and a coil spring 13, seated in a suitable opening 14, engages the blade 7, forwardly of the pivot 8, and normally tends to hold the blade in open position, as will be more fully explained hereinafter.

The bottom faces of the fixed jaws or blades 2 are inclined upwardly and forwardly as at 16 and converge with the top face 15, to form a nose 17, and the shape of the movable cutting blade 7 is such that the cutting edge 18 thereof will normally form an acute angle with the cutting faces 16 of the fixed jaws. Thus the blade 7 is formed with a straight flat bottom edge or wall 19, extending throughout the greater part of its length, and which normally lies parallel to and flush with the bottom face 5 of the body 1. The cutting end 9 of the blade 7 is formed with a curved bottom edge 20 which merges with the downwardly and forwardly inclined cutting edge 18.

Extending into the body 1 is an operating shaft 21, provided with a double lobed cam 22. The lobes of this cam are in alinement with and successively engage the cam follower or plunger 11, which action will rock the blade 7, on its pivot pin 8, at a rapid rate of speed, thereby moving the forward or cutting end of the blade relative to the companion or fixed blades 2 between which it operates. Bearings 23 and 24 are provided through which the operating shaft extends and a pin 25 prevents accidental removal of the shaft and bearing assembly.

The operating shaft is so constructed as to be received in the bit chuck of an electrically or pneumatically driven hand drill for considerations of portability and general convenience. Thus when the free end of the shaft 21 is in the bit chuck of a drill, not shown, the eccentric mounting of the shaft will cause the tool to automatically swing to operative position thus leaving one hand free.

In practice, assuming that it is desired to cut a damaged section 26, from a sheet metal part 27, the operator merely drills or otherwise forms holes or openings 28 defining the area to be removed and of sufficient size to receive the cutting end 9 of movable blade 7. The portion 9 of blade 7 is then inserted in one of the holes 28 and cuts made from one hole to another until the damaged or defective section has been severed and removed.

By virtue of the shape of the part 9 of the blade 7 and the nose part 17 of the fixed jaws or blades 2, the movable cutter blade can be readily inserted in the hole 28 and the tool can be conveniently used in closed quarters and with any size of electric or pneumatic drill. Thus, as illustrated in Figure 3 of the drawings, when the movable cutter has been inserted through the work to be cut, the upwardly and forwardly inclined bottom faces 16 of the fixed cutters will rest upon and slide over the work, the rear end of the tool and power drive element being tilted or elevated for this purpose. This permits of the use of a much larger drill than otherwise could be accommodated, and the flat or straight oppositely inclined faces 16 and 18 of the pointed upper and lower cutters respectively permit of quick and accurate adjustment of the blades with respect to the work.

It will be understood that when the operating shaft is actuated the cam 22 will force the tail of the blade 7 downwardly and the cutting edge upwardly against the tension of spring 13 and that the spring returns these members to their normal inoperative positions.

Having thus described my invention, what I claim is:

A cutting tool comprising a body having a flat horizontally disposed lower face throughout a greater portion of its length and oppositely inclined upper and lower faces converging at the front end of said body, said lower inclined face merging with said horizontal face, said front end having a slot formed therein to define parallel fixed blades, said horizontally disposed lower face having a longitudinally disposed slot therein communicating with said first mentioned slot, a movable blade pivotally mounted in said last mentioned slot for reciprocatory movement between said fixed blades, said movable blade having a straight cutting edge disposed at an acute angle to said lower inclined faces, and means for rocking said movable blade on its pivot.

CHARLES L. BEARD.